United States Patent [19]
Hallberg et al.

[11] Patent Number: 5,920,015
[45] Date of Patent: Jul. 6, 1999

[54] PRESSURE SENSOR WITH CAPACITOR ELECTRODES AND SHIELD LAYER PARALLEL THERETO

[75] Inventors: Nils Gunno Hallberg, Atvidaberg; Staffan Jonsson, Sollentuna, both of Sweden

[73] Assignee: Cecap AB, Karlskoga, Sweden

[21] Appl. No.: 08/722,012

[22] PCT Filed: Apr. 18, 1995

[86] PCT No.: PCT/SE95/00425

§ 371 Date: Aug. 25, 1997

§ 102(e) Date: Aug. 25, 1997

[87] PCT Pub. No.: WO95/28624

PCT Pub. Date: Oct. 26, 1995

[30] Foreign Application Priority Data

Apr. 14, 1994 [SE] Sweden .................................. 9401268

[51] Int. Cl.⁶ ...................................................... G01L 9/12
[52] U.S. Cl. ............................ 73/724; 73/718; 361/283.4
[58] Field of Search ............................. 73/724, 718, 720, 73/721, 726, 727; 361/283.4; 338/42

[56] References Cited

U.S. PATENT DOCUMENTS

| 4,628,403 | 12/1986 | Kuisma | 361/283.4 |
| 4,823,603 | 4/1989 | Ferran et al. | 73/724 |
| 4,831,492 | 5/1989 | Kuisma | 361/283 |
| 4,935,841 | 6/1990 | Jonsson et al. | 361/283 |
| 5,189,591 | 2/1993 | Bernot | 361/283.4 |

FOREIGN PATENT DOCUMENTS

| 41 11 118 A1 | 10/1992 | Germany | G01L 9/12 |
| 41 36995 A1 | 5/1993 | Germany | G01L 9/12 |

*Primary Examiner*—Joseph L. Felber
*Attorney, Agent, or Firm*—Limbach & Limbach L.L.P.

[57] ABSTRACT

A capacitive sensor element for pressure sensors comprising a house part based on an electrically insulating material such as glass ceramic material and having on an interior surface a first capacitor plate. An opposing capacitor plate is attached to one side of a diaphragm of an electrically insulating material, which on its other side has an electrically conductive shielding layer that is intended to be connected to ground. The capacitor plates form an electrical capacitor, the capacitance of which is changed when the distance between the plates varies. A second electrically conductive shielding layer is preferably surrounded by the insulating material in the house part between a shielding plate and a thick support plate at a distance from the first capacitor plate. The second shielding layer is also intended to be connected to ground. By arranging the second shielding layer near the capacitor plates they are ensured a uniform electrical surrounding for reduction of the influence of stray capacitances. Further, the thick support plate gives the house part a good mechanical stability.

17 Claims, 3 Drawing Sheets

PRESSURE SENSOR WITH CAPACITOR ELECTRODES AND SHIELD LAYER PARALLEL THERETO

TECHNICAL FIELD

The present invention relates to pressure transducers or sensors for measurement of pressures derived from fluids of various kinds, both gases and liquids, and methods of producing such pressure transducers or sensors.

BACKGROUND OF THE INVENTION AND STANDPOINT OF THE ART

Sensor elements for pressure sensors based on ceramics and constructed as dilatation or strain sensors or capacitive sensors can conventionally comprise various ceramic materials. Often, then, ceramics is used based on aluminum oxide but also glass ceramics is used. There are some problems associated with the use of such sensors and some of them will be discussed hereinafter with reference to FIG. 1 and FIGS. 2a–2d.

A capacitive sensor element 1 of conventional type based on ceramics, for example glass ceramics, is illustrated in the sectional view of FIG. 1. The sensor element comprises a thick house part 1, in the shape of a plate 3 comprising an annular projection or platform 5 located at the circumference thereof on one side. At the annular projection a thin plate 7, a pressure diaphragm, is attached, which thus has a considerably lesser thickness than the house part 1. The house part 3 and the diaphragm 7 carry on their interior, opposite surfaces at the central portions thereof electrically conducting areas 9 and 11 respectively in the shape of thin layers, which normally have the same configuration and are located opposite each other and at a small distance of each other. When the distance between the opposite surfaces on the two conductive areas 9, 11 in the capacitor formed thereof is varied, the capacitor will have a varying capacitance, which is readily detected by means of suitable electronic circuits. For an optimally designed sensor element then the capacitance or some function derived therefrom in a simple way, for instance the inverted value of the capacitance, should be a linear function of for example the distance of the plates in the capacitor formed. The sensor element can then be used for pressure measurement and then, in the corresponding way, the electronically detected capacitance or some other quantity derived in a simple way should be proportional to the pressure acting on the diaphragm 7. However, deviations from the linear behavior are always present and will be described hereinafter.

The presupposition that a linear function exists or should exist, is based on the theory of the capacitance between two flat electrically conducting plates which are parallel to each other. However, for the pressure sensor according to FIG. 1, the movable diaphragm 7 and hereby the electrode plate or the electrode area 11, which is located thereon, will have some curved profile, when the diaphragm is exposed to an exterior pressure deviating from the pressure on the chamber formed between the house 3 and the diaphragm 7. The electrodes 9, 11 in the plate capacitor formed are thus then not flat and not parallel to each other. This deflection effect can be calculated numerically and has generally a small importance in a complete or finished pressure sensor having the sensor element attached in a house. If required, however, this effect can be compensated in an electronic way.

Another basic condition for the presupposition of a linear dependence of an output signal and the pressure acting on the diaphragm is that the magnitude of the deviation or deflection of the diaphragm is proportional to the applied pressure force. It is valid for small deviations from the equilibrium position of the diaphragm, where the equilibrium or rest position can be the state of the diaphragm for equally large pressures on the two sides thereof. However, for larger deflections from the rest position the deflection will not follow the pressure force proportionally but is less than what would be obtained in an ideal proportional case. The deflection of the diaphragm can be calculated in different ways, such as for example be calculated approximatively by means of a theory such as "Large Deflection Theory, LDT". This non-linear effect can be eliminated by a correct dimensioning of the diaphragm, for limited pressure ranges, and a good resolution of the electronic circuit which detects the electrical quantity which is a measure of the pressure. Practically, this effect occurs especially in very thin diaphragms, since thick diaphragms where the thickness of the diaphragm is considered in relation to the height of the deflection, break before they reach the non-linear deflection range.

The dominating cause of deviations from a non-linear behaviour of capacitive sensor elements according to what has been discussed above, is however stray capacitance of various kinds. There are both edge effects at the edges of the capacitor plates and capacitances in relation to other electrically conductive surfaces and areas adjacent the capacitor electrodes. These effects thus produce deviations from the linear behaviour of an output signal from the sensor element which are definitely outside what can generally be accepted by a user of precision pressure sensors. The influence of the various stray capacitances is complicated and can be described as combinations (for example sums) of functions of different kinds, a constant function, a linear function, non-linear functions of various kinds such as exponential functions, etc.

The influence of stray capacitances can be divided both in the fact that they affect the maximum value of the deviation from a linear behavior and a deviation curve having different profiles over the measuring range of the sensor. Different forms of deviations from the linear behavior are illustrated in the diagrams of FIGS. 2a, 2b, 2c and 2d. The deviation is shown as a function of the applied pressure between the value 0 (corresponds to the rest position) and the value indicated by FS (="Full Scale"), which designates the upper limit of the measuring range. For a digitally working processor it is naturally possible to compensate these various deviations but for simpler electronic components of a more robust type, difficulties can be obtained in the compensation procedures.

The desired compensation signal, which is to be superposed on the deviation from a linear behavior of the output signal can be described as a polynomial of the deviation from the normal position of the input signal, for instance of the pressure. For simpler electronic circuits, terms in the compensation signal can be achieved up to and including the quadratic term. It is more difficult to use functions having higher degrees when using electronic components of standard type. In such a linear compensation having at most quadratic terms it facilitates significantly if the deviation curve is symmetrical, see FIG. 2a. The maximum magnitude of the deviation can be adjusted by means of adjustment of constants in the compensation function. Generally, however, the case is that a large value of the maximum deviation also results in an increased asymmetry of the curve, which for a good compensation, also if the deviation from the linear behaviour is symmetrical in accordance with FIG. 2a, a deviation having an S-shape is obtained, compare FIG. 2d, in the compensated output signal. This effect is however most often of a more theoretical nature and will generally not be observable to a user of the pressure sensor.

The magnitude and the shape of the curve of the deviation of the output signal from a linear dependence of the input signal can be influenced by designing the sensor element in different ways. It is conventional art to coat the sensor house part and the diaphragm part with an electrically conductive layer located on the outsides thereof, a shielding layer, which is connected to electrical ground. The layer of material can be of gold, platinum, silver, an alloy of silver and platinum, titanium nitride, tin indium oxide, etc. In the pressure sensor disclosed in the patent U.S. Pat. No. 4,935,841 the exterior, usually flat surface of the plate-shaped house part has been provided with a centrally located recess having a bottom surface which is located at a small distance from that electrode in the measurement capacitor, which is coated on the interior side of the house part. The exterior, grounded conductive layer is also coated in this recess and makes the electrical conditions around the capacitor electrode of the house part more uniform. Hereby deviation of the output signal from a linear behaviour will be effected both as to magnitude and shape.

When such a centrally located recess in the house part is provided, however, the sensor element obtains a reduced strength and the region at the bottom of the recess can even form a second flexible diaphragm, which will also in turn be influenced by the exterior pressure changes, for instance for a mounting of the sensor element where the load of the pressure which is to be measured is on only one side, that is, so that the pressure only acts on the measurement diaphragm, whereby this secondary diaphragm is influenced by the pressure changes in the surroundings, that is from the atmosphere. The movement of this secondary diaphragm will then cause incorrectnesses in the function of the sensor element. Incorrect functions can naturally also occur by the fact that ruptures appear at the connection or transfer region between the differently thick portions of the house part.

This sensitivity to changes of the exterior atmospherical pressure is for normal conditions small and is heavily extended in time. A user will not normally observe it. For extremely low exterior pressures, which can occur associated with very bad weather, a direct influence on the sensor element can be obtained. The mechanically weakening effect of the recess can largely be eliminated by filling the recess with a plug in the shape of a small cylindrical plate, which is attached in the recess by means of a suitable joining material, for glass ceramics a paste containing finely divided glass. Hereby, the house part of the sensor element will be stabilized mechanically. Such a sensor element will however have a complicated production procedure and will be subject to rupture at the recess.

A capacitive pressure sensor is described in the German patent application DE-A1 41 36 995 (Offenlegungsschrift). In the embodiment shown in FIG. 5, the interior surface of the diaphragm 4, the movements of which are detected, is coated with an electrically conductive shielding layer 9 by means of thin film methods. On the interior surface of this layer then a thin dielectrical layer 10 is deposited, which operates as a carrier or support of the diaphragm electrodes 7, 7'. The movable part will hereby be constituted by a rather complicated layered structure which will then present different characteristics as to elasticity and thus as to the movements, when the temperature varies, what results in that the detected quantity will have a dependence of temperature for which a prediction is difficult to make. It has also a negative influence on the zero stability of the measurement cell over long times.

DESCRIPTION OF THE INVENTION

It is an object of the invention to provide a pressure sensor having a high linearity, that is that the output signal is highly proportional to the input signal, i.e. the pressure that acts on the sensor.

It is a further object of the invention to provide a pressure sensor of the capacitive type for which the electrical surroundings of capacitor plates incorporated in a sensor element are highly uniform.

It is another object of the invention to provide a pressure sensor comprising a sensor element, which has a good stability and strength and for an attachment or mounting, such that the measurement pressure acts on one side of the sensor and the atmospherical pressure on the other side thereof, tolerates large changes of the atmospherical pressure without affecting its output signal significantly.

It is another object of the invention to provide a pressure sensor having a high accuracy, for which a sensor element incorporated in the pressure sensor can be produced in a rather simple way.

It is a further object of the invention to provide a sensor element for a pressure sensor, wherein the measurement diaphragm has a uniform, stabilized attachment or clamping to a house in the sensor element.

It is a further object of the invention to provide a pressure sensor comprising a capacitive sensor element, for which the influence of stray capacitances is minimized and the possible variation from a linear behaviour for an output signal from the sensor element can be adjusted or adapted to a desired shape.

It is another object of the invention to provide methods of producing a capacitive sensor element incorporated in a pressure sensor which result in pressure sensors having a high precision.

The objects mentioned above are achieved by the invention, the more detailed features and characteristics of which appear from the appended claims.

A sensor element for a pressure sensor comprises, as is conventional according to what has been discussed above, a thick, stable house part, which on an interior surface comprises a first capacitor electrode having a flat surface. Further, a diaphragm is provided having an exterior surface which is intended to be exposed to the medium, the pressure of which is to be measured. On the exterior surface a first electrically conductive layer is arranged which is intended to be connected to electrical ground. On the opposite, interior surface of the diaphragm a capacitor electrode is provided having a flat surface. The capacitor electrodes are located opposite each other and at a small distance from each other for forming an electrical capacitor, the capacitance of which is changed when the distance between the electrodes varies. The various surfaces are generally parallel to each other and the house part and the diaphragm are constructed as plates having essentially the same outline or shape of the exterior edge thereof, in particular as circular plates having the same diameter.

Further, a second electrically conducting layer is provided, which is arranged inside the house part, so that it on its both sides is surrounded by the material or portions of the house part, and which is parallel to the first capacitor electrode, at least its flat surface. The second conductive layer constitutes an area which has a considerably larger extension than the first capacitor electrode and which surrounds this electrode, as viewed perpendicularly to the layer and the surface of the electrode, so that, as seen in this direction, a distance exists from the edge or the circumference of the electrode to the edge of the conductive layer, which is at least as large as a diameter or the largest measure of the electrode and preferably larger than it, for example 2–3 times this largest measure. The capacitor electrode is thus located substantially opposite to an interior region of the second electrically conductive layer, which like the first layer is intended to be connected to electrical ground.

The distance from the second electrically conductive layer inside the house part to the capacitor electrode arranged on the house part is advantageously of the same magnitude of order as the distance from the first electrically conductive layer on the diaphragm to the capacitor electrode arranged on the diaphragm or is less than it and it can even be substantially smaller than it in order to make the electrical conditions around the capacitor electrodes more uniform.

The house part must have a sufficient stability, so that it will not be deflected for any of those pressure differences, to which the sensor element will be exposed. It is achieved by constructing the house part of a thicker support plate and a thinner shielding plate and the second, electrically conductive layer arranged therebetween.

The different carrying or supporting components of the house part and of the diaphragm is preferably made of ceramic material, in particular of glass ceramics. They are in the latter case joined to each other by means of glass joints.

For pressure sensors intended for low pressures having thin measurement diaphragms it can be advantageous if on the exterior side of the diaphragm an extra part is placed in the shape of a counterplate or a counterring, the portion of which that projects at the margin thereof or is located at the edge thereof is joined to the thin diaphragm as a joint of a suitable material, for example a glass joint. A counterplate is in that case provided with through holes in order that the pressure from the medium, the pressure of which is to be measured, will reach and affect the measurement diaphragm itself. Providing a counterpart of this kind results in that the measurement diaphragm will be more uniformly attached or clamped at the portion thereof located at the circumference. The counterplate or counterring stabilizes the thin diaphragm and reduces the risk that it will break when using the sensor element.

BRIEF DESCRIPTION OF THE DRAWINGS

The invention will now be described in more detail with reference to not limiting embodiments and with reference to the accompanying drawings, in which.

DESCRIPTION OF PREFERRED EMBODIMENTS

Figure 1:
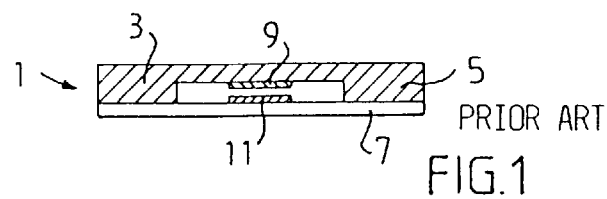
FIG. 1 is a cross section of a conventional pressure sensor element.
Figure 2A:
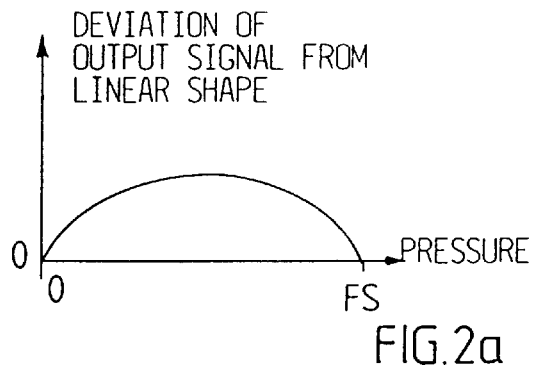
FIGS. 2a, 2b, 2c and 2d are typical curve shapes for the deviation of the output signal from a linear behaviour.
Figure 2B:
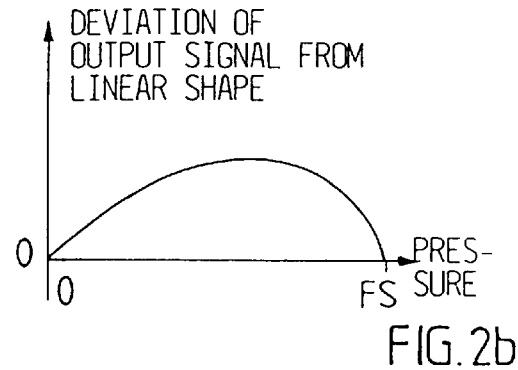
Figure 2C:
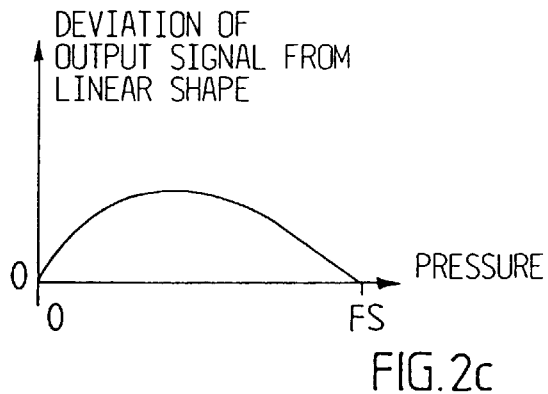
Figure 2D:
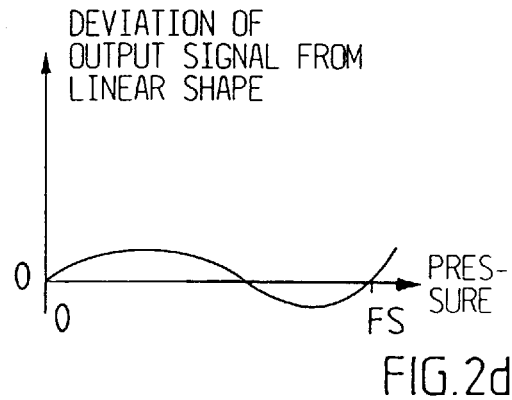
Figure 3:
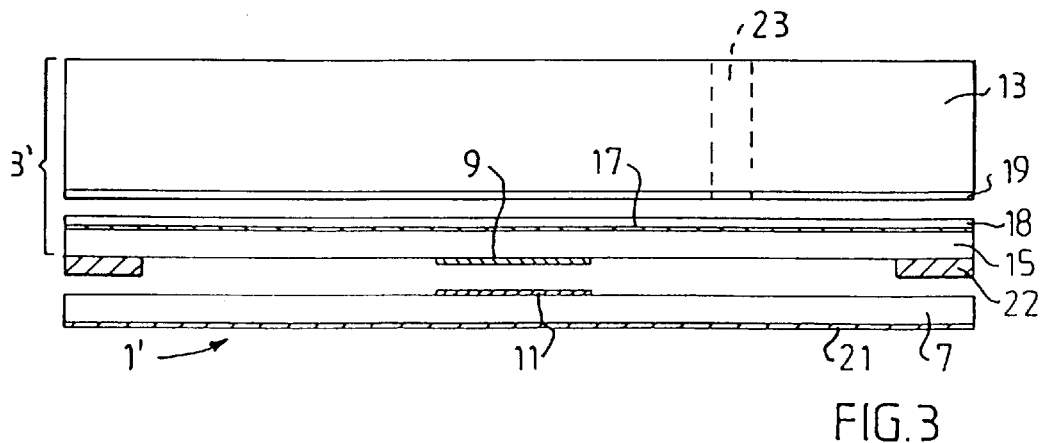
FIG. 3 is a cross section of different parts for providing a pressure sensor having a low influence from stray capacitances.

In FIG. 3 the different parts of a sensor element are shown in sectional views which are intended for pressure sensor of precision type and based on glass ceramics, where the parts are placed above each other before the final joining by heating in an oven for melting of the glass material in the joint regions. The thick house part 3' here comprises two separate, circular ceramic plates, an upper thicker support plate 13 and a lower, thinner shielding plate 15. On one side of the shielding plate 15, on its interior surface and centrally thereon, as has been described earlier, one capacitor electrode 9 is arranged in the shape of a thin electrically conductive layer. On the other opposite side of the shielding plate, an electrically conductive layer 17 is provided, that extends all over of the surface and acts as a shielding plane and is to be connected electrically to a ground conductor, see the discussion hereinafter. On top of the shielding layer 17 a joint layer 18 is provided, which comprises finely divided glass material retained by a generally organic binding agent. A corresponding joint layer 19 can also be provided on the surface of the thicker support plate 13, which faces the surface of the shielding plate 15, that is provided with the electrically shielding layer 17.

The circular diaphragm 7 is as is conventional designed to have a thickness adapted to the pressure range, which is to be measured, and is centrally, on one of its surfaces, coated with a thin layer, that constitutes the second capacitor electrode 11 and over all of the opposite surface it is coated with an electrically conductive, thin shielding layer 21, which is also to be connected to a ground conductor.

At the exterior edge of the side of the shielding plate 15, which is provided with the capacitor electrode 11, a region 22 is also arranged comprising glass material for forming a glass joint and this region 22 has the shape of a circular cylindrical ring having a small extension in the axial direction. This extension or height is accurately adjusted and ground to a constant length, in order to produce, after heating and forming the glass joint, a desired distance between the surfaces of the shielding plate 15 and the diaphragm 7, which support or carry the capacitor electrodes 9 and 11, respectively.

As has been indicated above, the different parts illustrated in FIG. 3 are placed in an oven under a moderate compression load and are heated, and then the material in the glass joint regions, that is both the joint regions 18 and 19 provided all over of the surfaces on the shielding plate 15 and the support plate 13, respectively, and the annular, distance producing region 22 on the shielding plate, melts and the organic binding agent evaporates or at least the large portion thereof disappears or exits hereby. Thereby a sensor element 1' is formed as an integrated unit.

The shielding layers 17 and 21 can comprise gold films, which are deposited or attached in the conventional way as in the manufacture of electronic thin film circuits. The shielding layers 17, 21 can have typical thicknesses of the magnitude of order of 1 $\mu$m or less. The joint layers between the shielding plate 17 and the support plate 3 can each one have the magnitude of order of 5 $\mu$m. Also the electrodes 9 and 11 and the connections thereof respectively which are formed of suitable printed conductor patterns, not illustrated in the Figure, on the surfaces, where the electrodes 9 and 11 respectively are arranged, can be deposited or coated by means of the same, previously known methods. The material that forms the joint regions 17 and 19 respectively all over of the surfaces, can be deposited in a dotted or patterned manner, that is so that regions or channels void of glass material are provided when the glass material is initially deposited. It will facilitate the exit or disappearance of volatile substances in the final heating, so that no enclosures of gases or other substances are formed. For a suitable design and a suitable temperature during the heating process it can still be obtained that the joint produced by these layers 17 and 19 will be substantially homogeneous having no enclosed cavities.

In the finished sensor element 1' the interior shielding layer 17 is not located easily available to come into electrical contact with a ground conductor, but therefor a special arrangement is required. It is illustrated in detail in FIG. 4. A through-hole 23 is thus provided in the upper support plate 13, which hole extends between the two large surfaces of these plates. Within the small region, which corresponds to the opening or mouth of this hole 23 in the glass joint region 18 of the shielding plate 15, solder tin 25 is provided which is in electrically conducting contact with the shielding layer 17 on the shielding plate 15. Before the compression and heating of all of the assembly thus the parts are placed as has been described earlier, against each other and an electrical conductor 27 is introduced downwards into the hole 23, possibly having some support material, as shown at 29, arranged at the sides thereof. In the heating or burning of the glass joint regions the solder tin melts and will come in electrically conducting contact with the electrical conductor 27. The conductor 27 is then electrically conducted to ground.

Figure 4:
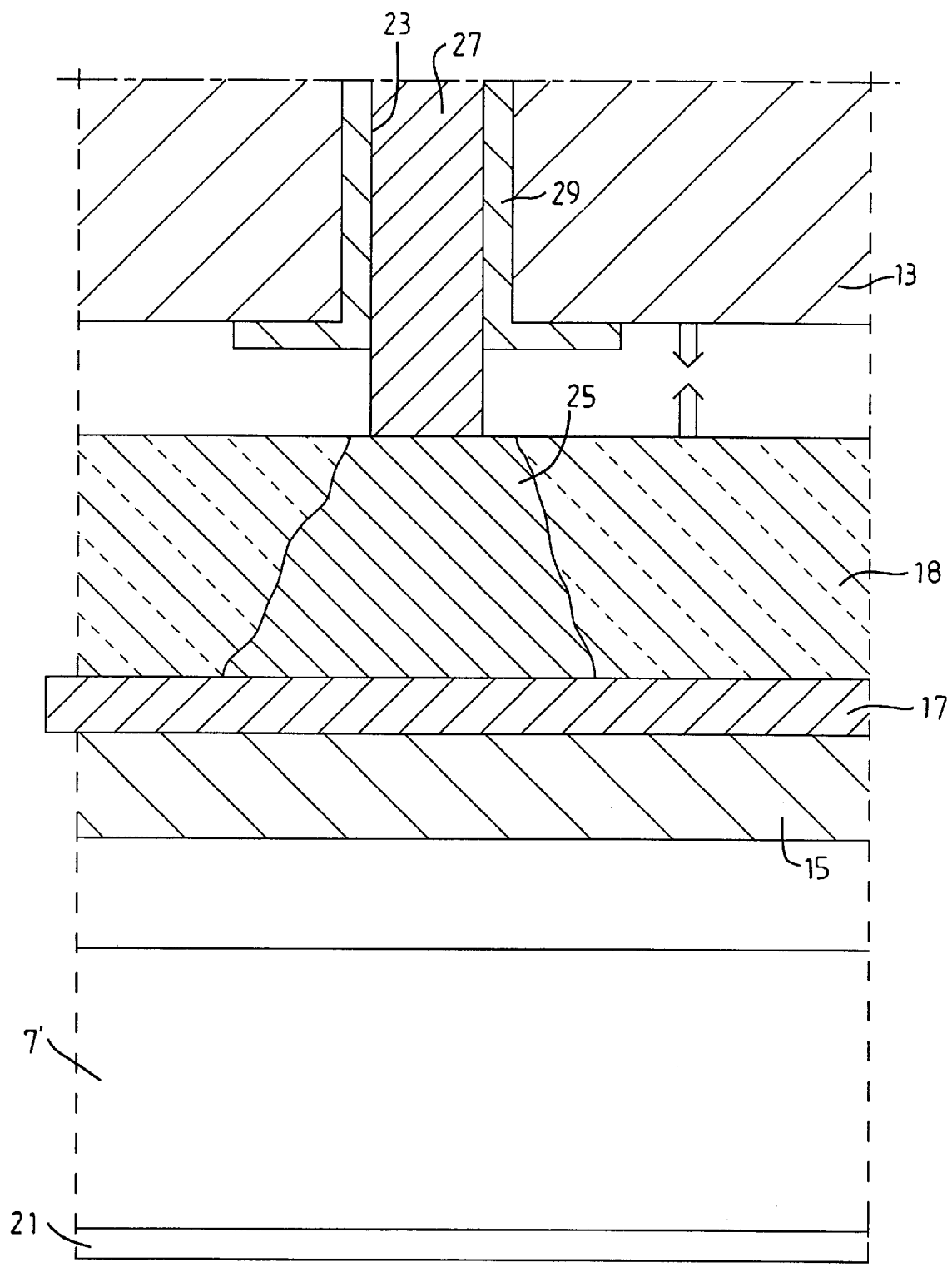
FIG. 4 is a partial section of a region of a variation on the sensor element of FIG. 3 (in which thick diaphragm 7' replaces relatively thin diaphragm 7) where an electrical connection of an interior shielding layer is made.

The thickness of the ceramic basic material in the shielding plate 15 can have the same magnitude of order as the thickness of the diaphragm 7 (as shown in FIG. 3) but is in many cases smaller, as the thickness of plate 15 is less than that of diaphragm 7' as shown in FIG. 4. The joint layer 19 on the support plate 13 can be eliminated, as is shown in FIG. 4, where for producing the glass joint between the shielding plate 15 and the support plate 13 only the joint layer 18 on the shielding plate 15 is provided.

It can even be advantageous to design the shielding plate to have a very small thickness, in order to equalize or even out the electrical conditions in the neighbourhood of the capacitor plates 9 and 11. The stability is provided by the upper support plate 13. The influence of stray capacitances can be minimized in this way and further, the remaining deviation of the output signal from a linear behaviour can be adapted or adjusted to a desired shape. Hereby, the sensor element can be built into a pressure sensor constructed without any complicated compensational electronics and only comprising simple electronic standard components, which gives a low cost and a low current consumption for the whole pressure sensor comprising the sensor element, a housing or casing, not shown, and the associated driver electronics.

Figure 5:
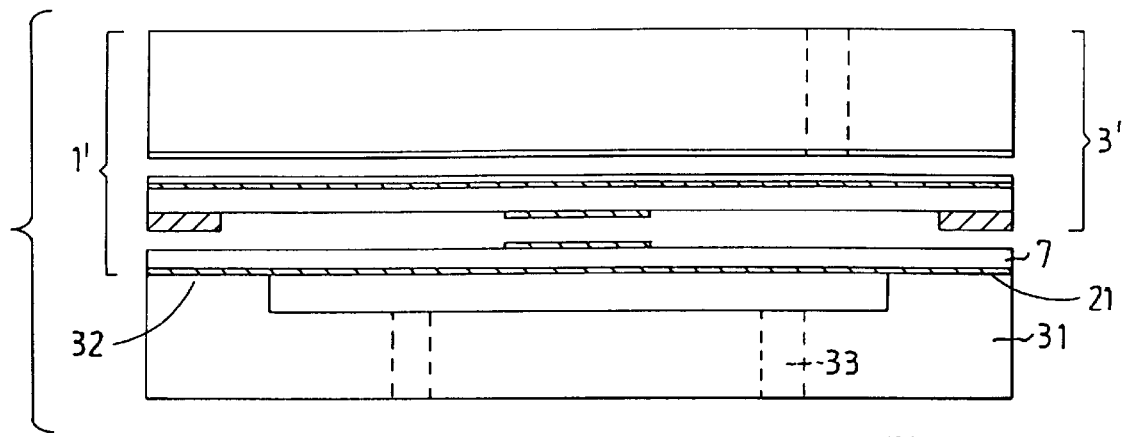
FIGS. 5 and 6 show the sensor element parts according to FIG. 3 supplemented with different support elements.
Figure 6:
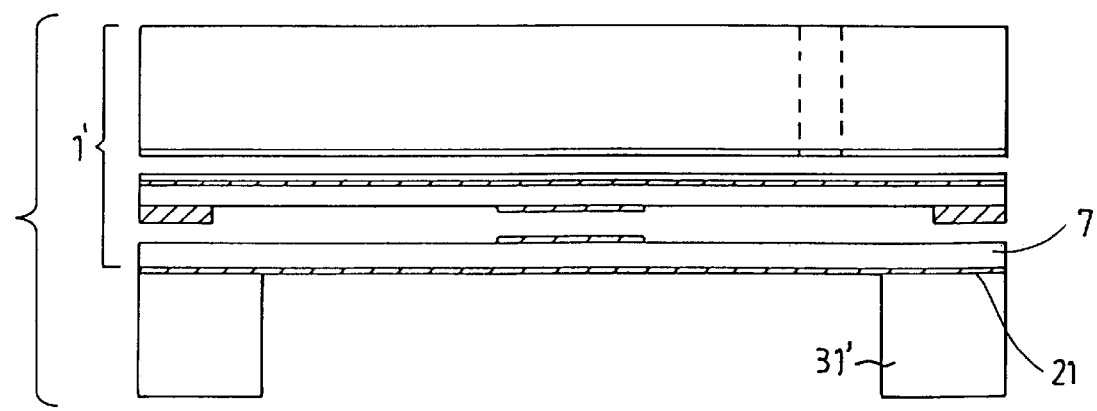

For the case of thin diaphragms, which are used for measuring very low pressures, a further reinforcement can be arranged for the diaphragm by attaching a reinforcement element to the marginal portion of the thin diaphragm. It is shown schematically in FIGS. 5 and 6, in which parts included in a sensor element are depicted in the same way as in FIG. 3. On the side of the diaphragm 7, that is turned away from the house part 3' and that is intended to face the medium, the pressure of which is to be measured, thus a reinforcement element is provided in the shape of a plate 31 having an annular projection 32 on one of its large surfaces, at the margin thereof, and further comprising through-holes 33 in the interior, more centrally located region of the plate 31. The counterplate 31 can be of a suitable material, for example of glass ceramic material like the other parts of the very sensor element 1' and is then joined to the shielding layer 21 on the diaphragm by means of a suitable glass ceramic material. The reinforcement element can also be constituted by an annular element 31' according to FIG. 6, that corresponds to the annular projection 32 on the counterplate 31 according to FIG. 5.

The different steps when producing the sensor elements will now be described in short. A house part is produced of two plate shaped parts of an electrically isolating material such as glass ceramics, an outer thicker support plate and a thin shielding plate, and on one surface, the interior surface of the house part, that is on the inner side of the thin shielding plate, in a suitable pattern, an electrically conducting material is deposited such as by means of common thin film methods for forming a first capacitor electrode, that has a flat surface. A diaphragm is produced of principally the same electrically isolating material in the shape of a plate and on one surface thereof, the interior surface, also an electrically conducting material is attached or deposited in a suitable pattern for forming a second capacitor electrode, having also a flat surface. The house part and the diaphragm are joined to each other, so that the capacitor electrodes will be located opposite to each other having their flat surfaces located at a small distance from each other, so that an electrical capacitor is formed, the capacitance of which is changed, when the distance between the electrodes and in particular the flat surfaces thereof vary. The two parts which constitute the house part are joined to each other and then, therebetween an electrically conducting layer is placed. The electrically conducting layer is to be placed so that it extends in parallel to the flat surface of the first capacitor electrode, and further it should have a considerably larger extension than the first capacitor electrode, which will be located essentially at or opposite an interior, centrally located area of the electrically conducting layer, so that the conducting layer surrounds the capacitor electrode. On an exterior surface of the diaphragm, for additional electrical shielding, a further electrically conductive layer can be arranged. A reinforcement element in the shape of an annular plate or a plate having an annular projection and made of electrically isolating material can further be attached to a region at the circumference of an exterior side of the diaphragm for stabilizing it.

We claim:

1. A sensor element for pressure sensors, comprising:
   a house part of a substantially electrically insulating material, which on a first surface comprises a first capacitor electrode having a flat surface,
   a diaphragm of a substantially electrically insulating material, which on a first surface comprises a second capacitor electrode having a flat surface, the capacitor electrodes being located opposite each other and having their flat surfaces located at a small distance from each other so that said electrodes form an electrical capacitor, the capacitance of which is changed when the distance between the electrodes varies,
   an electrically conductive layer positioned within the house part with sides of the electrically conductive layer against interior opposite sides of the house part, wherein the electrically conductive layer is parallel to the flat surface of the first capacitor electrode, the electrically conductive layer has a substantially larger extension than the first capacitor electrode, an interior area of the electrically conductive layer is located opposite the first capacitor electrode.

2. A sensor element according to claim 1, wherein the diaphragm includes:
   a second electrically conductive layer arranged on a second surface of the diaphragm, wherein the second surface is parallel to the first surface.

3. A sensor element according to claim 2, wherein the distance from the electrically conductive layer to the first capacitor electrode has the same order of magnitude as the distance from the second electrically conductive layer to the second capacitor electrode.

4. A sensor element according to one of claims 1–3, wherein the distance from the electrically conductive layer to the first capacitor electrode is small compared to the thickness of the diaphragm so that the electrically conductive layer is sufficiently close to the first capacitor electrode that the electrical surroundings of the first capacitor electrode will be highly uniform.

5. A sensor element according to one of claims 1–3, wherein the house part comprises a support plate of an electrically insulating material and a shielding plate of an electrically insulating material, wherein the shielding plate is thinner than the support plate, and the electrically conductive layer is arranged between the support plate and the shielding plate.

6. A sensor element according to one of claims 1–3, also including:
   a reinforcement element of electrically insulating material having an outer edge portion attached to an outer edge portion of the diaphragm.

7. A sensor element according to claim 6, characterized in that the reinforcement element comprises a support plate having a plate shaped main part and an annular projection located at an edge thereof, on which a top surface is attached to the diaphragm.

8. A sensor element according to claim 6, characterized in that the reinforcement element comprises a support ring, on which an annular flat surface is attached to the diaphragm.

9. A sensor element according to claim 1, wherein the electrically insulating material is a glass ceramic material.

10. A sensor element according to claim 2, wherein the distance from the electrically conductive layer to the first capacitor electrode is smaller than the distance from the second electrically conductive layer to the second capacitor electrode.

11. A sensor element for pressure sensors, comprising:
   a house part of a substantially electrically insulating material,
   a diaphragm of a substantially electrically insulating material, wherein the diaphragm has an interior side and an exterior side, and an edge of the interior side of the diaphragm is attached to the house part,
   means comprising or producing an electrically detectable quantity which is changed in response to change in an exterior pressure against the diaphragm,
   a reinforcement element of an electrically insulating material, wherein the reinforcement element is a support ring having an annular flat surface attached to the exterior side of the diaphragm.

12. A method of producing a sensor element, comprising the steps of:
   producing a house part of an electrically insulating material in the shape of a plate having an interior surface and exterior surface,
   arranging or depositing on the interior surface a first capacitor electrode having a flat surface and being of an electrically conductive material,
   producing a diaphragm of an electrically insulating material in the shape of a plate having a diaphragm interior surface and a diaphragm exterior surface,
   attaching to or depositing on the diaphragm interior surface a second capacitor electrode having a flat surface of an electrically conductive material,
   joining the house part and the diaphragm to each other so that the capacitor electrodes are located opposite each other with their flat surfaces located at a small distance from each other for forming an electrical capacitor, the capacitance of which is changed when the distance between the electrodes varies,
   wherein the step of producing the house part includes the steps of joining two parts of electrically insulating material with an electrically conductive layer arranged between the two parts so that the electrically conductive layer will be placed parallel to the flat surface of the first capacitor electrode, with the first capacitor electrode attached to one of the parts, the electrically conductive layer will have a considerably larger extension than the first capacitor electrode and the first capacitor electrode will be located essentially opposite an interior region of the electrically conductive layer.

13. A method according to claim 12, characterized in that an electrically conductive layer is arranged on an exterior surface of the diaphragm.

14. A method according to claim 13, characterized in that in producing the house part it is arranged so that the distance from the electrically conductive layer inside the house part to the first capacitor electrode arranged on the house part will be essentially equal to the distance from the electrically conductive layer, which is attached to the diaphragm, to the second capacitor electrode attached to the diaphragm or is smaller than it.

15. A method according to one of claims 12–14, characterized in that in producing the house part that part, on which the first capacitor electrode is arranged, is given a small thickness, so that the distance from the electrically conductive layer inside the house part to the first capacitor electrode arranged on the house part will be small compared to the thickness of the diaphragm.

16. A method according to one of claims 12–14, also including the step of:
   attaching a reinforcement element, having the shape of an annular plate or a plate having an annular projection and made of electrically insulating material, to an edge region of the diaphragm.

17. A method of producing a sensor element for pressure sensors, comprising the steps of:
   producing a house part of an essentially electrically insulating material,
   producing a diaphragm of an essentially electrically insulating material,
   attaching the diaphragm and the house part to each other so that an edge portion of a surface of the house part meets an edge portion of an interior surface of the diaphragm,
   providing means on at least one of the house part and the diaphragm, said means comprising or producing an electrically detectable quantity which changes in response to change of an exterior pressure against the diaphragm, when said diaphragm is attached to the house part, and
   attaching a reinforcement element of an electrically insulating material to the diaphragm, the reinforcement element having an annular shape, by attaching an annular flat surface of the reinforcement element to the diaphragm.

* * * * *